US008363066B2

(12) United States Patent
Weibrecht et al.

(10) Patent No.: US 8,363,066 B2
(45) Date of Patent: Jan. 29, 2013

(54) METHOD FOR DISPLAYING HIGH RESOLUTION IMAGE DATA TOGETHER WITH TIME-VARYING LOW RESOLUTION IMAGE DATA

(76) Inventors: Martin Weibrecht, Aachen (DE); Olivier Ecabert, Aachen (DE); Juergen Weese, Aachen (DE); Gundolf Kiefer, Aachen (DE)

( * ) Notice: Subject to any disclaimer, the term of this patent is extended or adjusted under 35 U.S.C. 154(b) by 821 days.

(21) Appl. No.: 12/093,762

(22) PCT Filed: Nov. 16, 2006

(86) PCT No.: PCT/IB2006/054297
§ 371 (c)(1),
(2), (4) Date: May 15, 2008

(87) PCT Pub. No.: WO2007/057855
PCT Pub. Date: May 24, 2007

(65) Prior Publication Data
US 2008/0316226 A1     Dec. 25, 2008

(30) Foreign Application Priority Data
Nov. 17, 2005     (EP) ..................................... 05300934

(51) Int. Cl.
*G09G 5/00*     (2006.01)
(52) U.S. Cl. ........................................ 345/629; 345/621
(58) Field of Classification Search .................. None
See application file for complete search history.

(56) References Cited

U.S. PATENT DOCUMENTS

| | | | | |
|---|---|---|---|---|
| 6,894,692 | B2 * | 5/2005 | Schinnerer | 345/539 |
| 7,271,814 | B2 * | 9/2007 | Anwar et al. | 345/629 |
| 7,427,996 | B2 * | 9/2008 | Yonezawa et al. | 345/629 |
| 2002/0057086 | A1 | 5/2002 | Mueller et al. | |
| 2004/0044282 | A1 * | 3/2004 | Mixon et al. | 600/427 |

FOREIGN PATENT DOCUMENTS

| | | |
|---|---|---|
| EP | 0166046 A1 | 1/1986 |
| EP | 0261791 A2 | 3/1988 |

OTHER PUBLICATIONS

Oakman, A.: "Volume Graphics:The Road to Interactive Medical Imaging"; 8 Page Document for Surprise 96, Downloaded From www.doc.ic.ac.uk/~nd/surprise_96/journal/vol2/ao2/article2.html.
Rosset et al: "OsiriX: An Open Source Software for Navigating in Multidimensional DICOM Images"; Journal of Digital Imaging, Springer-Verlag Publishers, vol. 17, No. 3, Sep. 2004, pp. 205-216.
Ratib, O.: "PET/CT Image Navigation and Communication"; Journal of Nuclear Medicine, Society of Nuclear Medicine, vol. 45, No. 1, pp. 46S-55S, Jan. 2004.
Chatziioannou et al: "Visualization of Whole Body PET Images"; Nuclear Science Symposium and Medical Imaging Conference, 1994, IEEE Conference Record, Norfolk, VA, Oct. 30-Nov. 5, 2004, IEEE vol. 3, Oct. 30, 1994, pp. 1399-1402.

* cited by examiner

*Primary Examiner* — Joni Richer
*Assistant Examiner* — Michelle Chin

(57) ABSTRACT

A method allowing display of time-varying merged high resolution and low resolution image data with a smooth frame rate. In one embodiment the high resolution data is structural image data and the low resolution image data is functional image data. The functional image data is gathered (20) into groups and each group is rendered and merged (24) together. The merged images produced are then stored (28) in a First In First Out (FIFO) buffer for display. While the merged images are displayed the next set of functional image data is merged and rendered and supplied to the FIFO buffer, allowing a smooth frame rate to be achieved. A computer program and a medical imaging apparatus using the method are also disclosed.

9 Claims, 4 Drawing Sheets

METHOD FOR DISPLAYING HIGH RESOLUTION IMAGE DATA TOGETHER WITH TIME-VARYING LOW RESOLUTION IMAGE DATA

The present invention relates to a method of displaying high-resolution data together with time-varying lower resolution image data. In particular, it relates to the display of high-resolution structural data together with lower resolution functional data.

It is known to use medical imaging techniques, for example computer tomography (CT), to provide structural or anatomical information. This anatomical information can include information about the bones, organs, etc. that are the subject of a CT scan. It is possible to obtain this anatomical image data at a high resolution.

It is also known to use medical imaging techniques to give functional information. This information indicates the function of the cells that make up the organs that are the subject of a scan. For example, radioisotope imaging may be used in which radiation originating from radioactive decay is used to determine the local concentration of an administered radioactive tracer in the body. Usually, the functional information is time varying, showing variations in processes over time. Unlike anatomical information, functional information is often of low resolution making it difficult to associate the functional information with a particular part of the anatomy.

US-2004/0044282-A1 relates to a medical imaging system and method in which a structural and functional scan are performed in sequence. Firstly, a CT scan of the coronary artery is performed to obtain structural data of the artery. Secondly, a Positron Emission Tomography (PET) scan of the coronary artery is performed to obtain functional data of the artery. The data of the CT scan is then combined with the data of the PET scan to allow structural and functional data to be displayed in a single image. This image can be static or dynamic in nature.

In order to produce a useful dynamic image, it is necessary to display the dynamic data at a sufficiently high and guaranteed frame rate. With present computer hardware it is possible to render the low resolution functional data with sufficient speed to achieve a displayed frame rate of around 20 Hz. However, because of the high resolution of the anatomical scan data, the frame rate is much reduced when fused anatomical and structural data is required. Using the method of US-2004/0044282-A1, it is necessary to render both the anatomical and functional data for every frame before that frame is displayed. This means that the display of images cannot occur at a smooth frame rate.

It is therefore an object of the present invention to improve the display of higher resolution data together with lower resolution data.

According to a first aspect of the present invention, there is provided a method of displaying first image data having a first resolution together with time-varying second image data having a second resolution which is lower than the first resolution, wherein the time-varying second image data comprises a plurality of second image data sets, with each second image data set representing a different point in time, the method comprising:

merging and rendering the first image data with a first group of second image data using rendering parameters representing a viewpoint to produce a first group of merged image data, wherein the first group of second image data comprises a plurality of second image data sets which are contiguous in time; and displaying the first group of merged image data as a sequence of images on a display;

wherein, during the step of displaying the first group of merged image data, the step of rendering and merging is repeated with a second group of second image data, and wherein rendering and merging of the second group of functional image data is completed before the step of displaying the first batch of merged image data has completed.

The first image data is preferably structural image data and the second image data is preferably functional image data.

In this method, the merging and rendering of the first image data with the second image data sets is carried out in groups. The group of merged data is displayed in sequence and during that time a second group of second image data is merged and rendered so that it is ready for display once display of the first group of merged data has completed. This ensures that a consistently smooth frame rate is achieved because one group of images are displayed while the next set of images is being rendered and merged.

Preferably the display of a group of merged image data while the next group is being processed is achieved by using a pipeline. The pipeline may be implemented in various ways. For example, the pipeline may be a First In First Out (FIFO) buffer, or may be a dedicated co-processor for used for display.

Advantageously, because the method of the present invention allows rendering and merging of several second image data sets in groups with the same first image data, the method can use parallel processing to improve its efficiency. The same operations are required to be carried out on each image in the functional image data group; this makes the method well suited to parallel processing.

Optionally, the method may also include receiving user input of a change of viewpoint. In that case, the processing of functional image data in groups allows the displayed image to maintain a constant frame rate despite the change in viewpoint. The time required to render and merge the first image data with the second image data group from the new viewpoint is known. Likewise the time remaining before the previously processed images have all been displayed is also known. A change of viewpoint is only implemented immediately if there is sufficient time for it to be processed before the previously processed images are exhausted. This allows a constant frame rate to be achieved while also allowing the viewpoint to be changed.

According to a second aspect of the present invention, there is provided a computer program comprising code means that, when executed by a data processor, instructs the data processor to perform the method of the above-described first aspect.

According to a third aspect of the present invention, there is provided a computer program product comprising a computer program according to the above-described second aspect embodied on a computer readable medium. Examples of suitable computer readable mediums include an optical storage medium, for example a Compact Disc, a magnetic storage medium, for example a magnetic disc, or a solid-state medium, for example flash memory.

According to a fourth aspect of the present invention, there is provided a medical imaging apparatus for displaying first image data having a first resolution together with time-varying second image data having a second resolution which is lower than the first resolution, wherein the time-varying second image data comprises a plurality of second image data sets, with each second image data set representing a different point in time, the apparatus comprising:

a storage device for storing instructions executable by a data processor and for storing first image data and a plurality of second image data sets;

a data processor which can be configured by the instructions stored in the storage device to execute the steps of:

merging and rendering the first image data with a first group of second image data using rendering parameters representing a viewpoint to produce a first group of merged image data, wherein the first group of second image data comprises a plurality of functional image data sets which are contiguous in time; and displaying the first group of merged image data as a sequence of images on a display;

wherein, during the step of displaying the first group of merged image data, the step of rendering and merging is repeated with a second group of second image data, and wherein rendering and merging of the second group of second image data is completed before the step of displaying the first group of merged image data has completed.

The first image data is preferably structural image data and the second image data is preferably functional image data.

Embodiments of the invention will now be described by way of example with reference to the accompanying drawings, in which.

Like reference numerals are used for like parts throughout the drawings.

Figure 1:
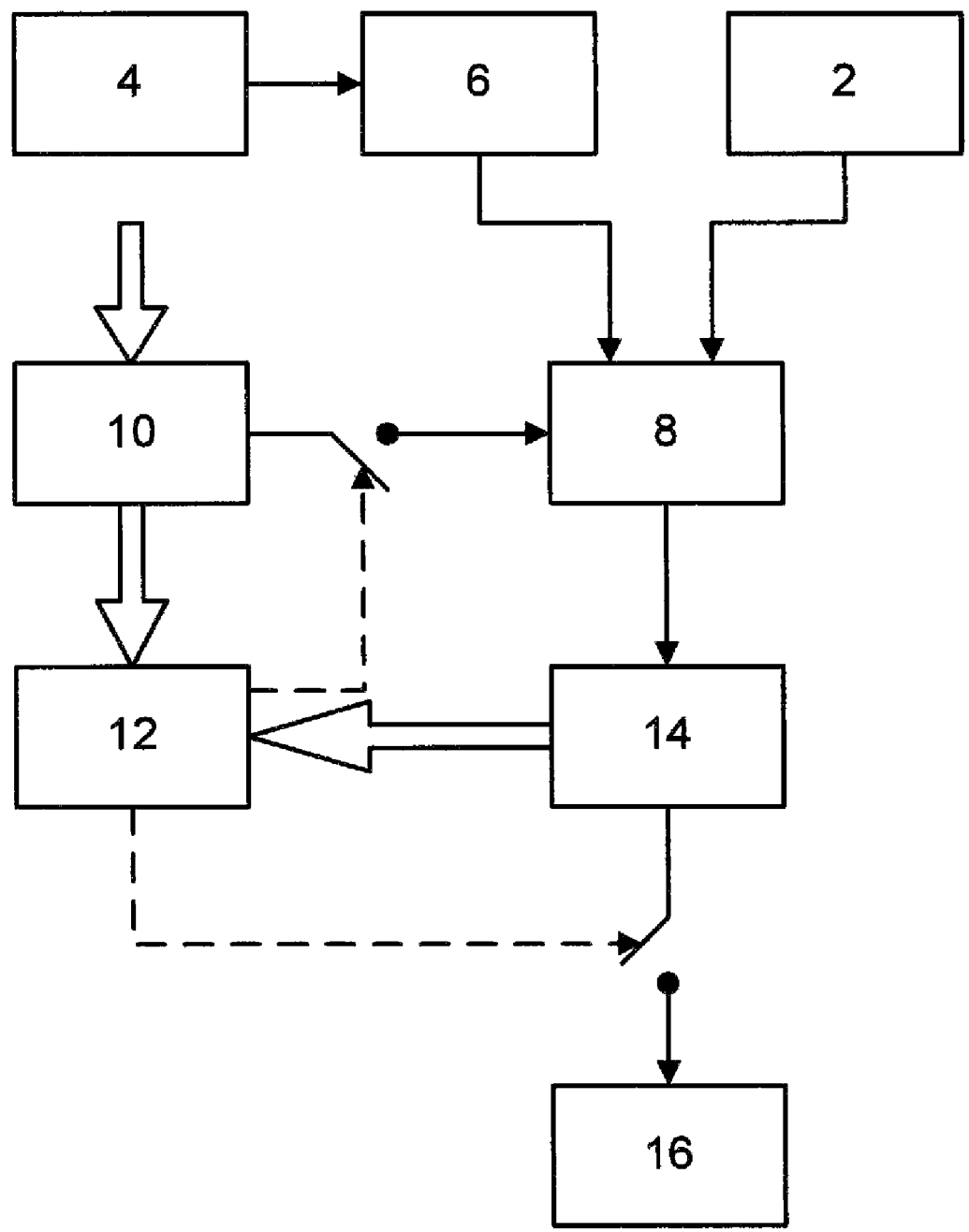
FIG. 1 is a diagrammatic representation of the structure of a computer program for implementing the method of the present invention.

FIG. 1 is a diagrammatic representation of the construction of a computer program for implementing a method according to a first embodiment of the present invention. The computer has an input of structural reference data 2 together with more than one functional data sets 4. The structural reference data 2 has a higher resolution than the functional data sets 4. Each functional data set 4 represents a particular point in time. Functional data groups 6 are generated from the functional data 4. Each group contains a number of functional data sets 4 which are contiguous in time.

A data fusion and rendering module 8 processes the structural reference data 2 and the functional data groups 6 to produce merged image data, i.e. image data that contains both structural and functional data. A set of rendering parameters 10 is provided to the data fusion and rendering module 8 under the control of a system controller module 12. The data fusion and rendering module 8 uses the rendering parameters 10 to generate a series of image data for display. Each image in the series of image data includes data of one functional data set 4 and is displayed as one frame on a display.

In this embodiment a First In First Out (FIFO) buffer 14 is provided for storing the image data generated by the data fusion and rendering module 8, although other means may be used in alternate embodiments. The system controller module 12 can determine the status of the FIFO buffer 14 (for example, how many images remain stored) and also controls supply of image data stored in the FIFO buffer 14 to a display controller module 16.

Figure 2:
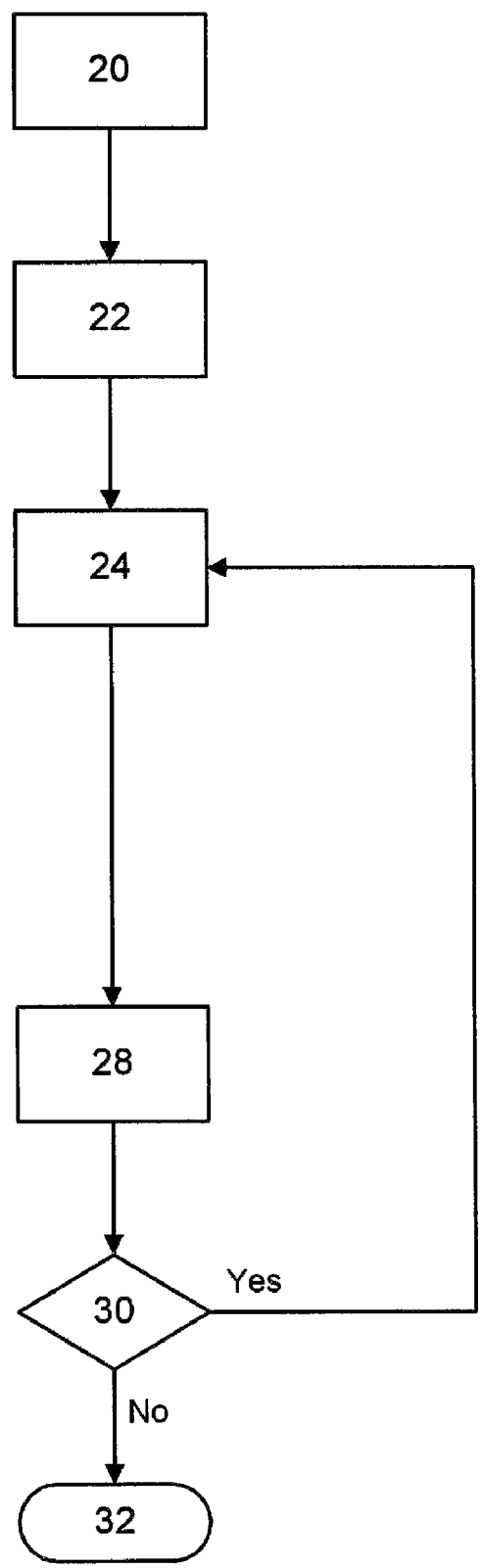
FIG. 2 is a flow chart of the method of a first embodiment of the present invention.

The method of the present invention is depicted in FIG. 2. In a first step 20, the functional data sets 4 are divided in groups, with each group comprising a predetermined number of functional image data sets 4. The images in each group are contiguous in time, i.e. the images in the group represent consecutive periods in time. In general, the number of functional image data sets 4 in each group is chosen so that the time to process all the functional image data sets 4 is approximately the same as the time to process the structural reference data 2. To give a numerical example, if the structural reference data 2 can be rendered in approximately one second, and the functional image data rendered in approximately one twentieth of a second then the number of functional images data sets in each group is twenty. It is also possible for the processing time to be split so the processing time for the structural reference data and the functional image data sets is other than the one-to-one relation described above.

In a second step 22, the viewpoint from which the data is to be displayed is determined and stored. This viewpoint may be a default viewpoint, which has been pre-selected, or it may alternatively be selected by user input. The viewpoint is stored as rendering parameters 10.

In a third step 24, the structural reference data 2 is merged and rendered with each functional image data set 4. This step is carried out by the data fusion and rendering module 8.

In the third step 24 of merging and rendering, the data fusion and rendering module 8 may use a variety of techniques. These can include techniques in which depth relations are taken into account and techniques in which depth relations are not taken into account. In several rendering techniques each pixel of the functional data can be attributed to specific position in the reference volume defined by the structural data. Examples of such techniques include maximum-intensity-projection and iso-surface rendering. In these techniques, the depth of each pixel is stored in data structures known as z-maps. The z-maps are used to merge and render the functional and structural projections with the correct depth relations.

Rendering techniques that take depth relations into account, but which do not use z-maps, may also be used. In these techniques the pixels of the projections do not refer to specific positions. An example of such a technique is volume rendering. In volume rendering a plurality of voxels along a ray is used to compose the pixel of the final projection. Therefore, the pixels do not refer to any specific depth in relation to others. In this case, it is necessary for the data fusion and rendering module 8 to merge and render the anatomical and functional data in a three-dimensional space. Preferably, this is achieved efficiently using parallel processing of the functional data sets contained in the functional data group. In that case, it is preferred to represent the functional data group by vectors that can than be processed by a vector processing unit. The elements of each vector refer to the same voxel coordinate at successive times. The complete functional data group is then represented by a three-dimensional array of vectors. This is particularly advantageous because several operations, for example ray-casting and fusion, are performed in the same way on all the functional data sets in the functional data group and thus are well suited for processing in parallel.

Which technique is used by the data fusion and rendering module 8 can depend on, for example, the nature of the anatomical and functional data, or on the basis of user input. The system controller 12 can adapt the frame rate at which images are displayed from the FIFO buffer 14 depending on the processing requirements of a particular rendering technique. For example, a computationally intensive rendering technique would be displayed at a lower frame rate than a less computationally intensive rendering technique.

When all the functional image data sets 4 in the functional image group 6 have been merged and rendered, the merged and rendered data is buffered in the FIFO buffer 14 in step 28. No images are displayed until the data fusion and rendering module 8 has processed the first of the functional data groups 6. The buffered data can then be displayed to a user. The display of data is carried out under the control of the system controller 12 which determines how often the next image is sent from the FIFO buffer 14 to a display, and hence the frame rate of the display.

Once a functional data group 6 has been fully processed by the data fusion and rendering module 8 and stored in the FIFO buffer 14, the system controller 12 determines, in step 30, whether any groups remain to be processed. If there are groups remaining to be processed execution returns to step 34. If there are no groups remaining to be processed the method ends at step 32.

The system controller 12 can estimate the processing time from the rendering parameters and use this determine the frame rate at which images are retrieved from the FIFO buffer 14 for display. The system controller 12 can therefore ensure that the processing time for the next functional data group is less than or equal to the time taken to display all the images from the FIFO buffer. This results in a display of images at a continuous frame rate substantially free from interruptions or pauses. To give an example, it is possible to process lower resolution data faster than higher resolution data. Therefore, the system controller 12 will control the FIFO buffer 14 to supply to a display images that are rendered from lower resolution data at a higher frame rate than images rendered from higher resolution data.

Figure 3:
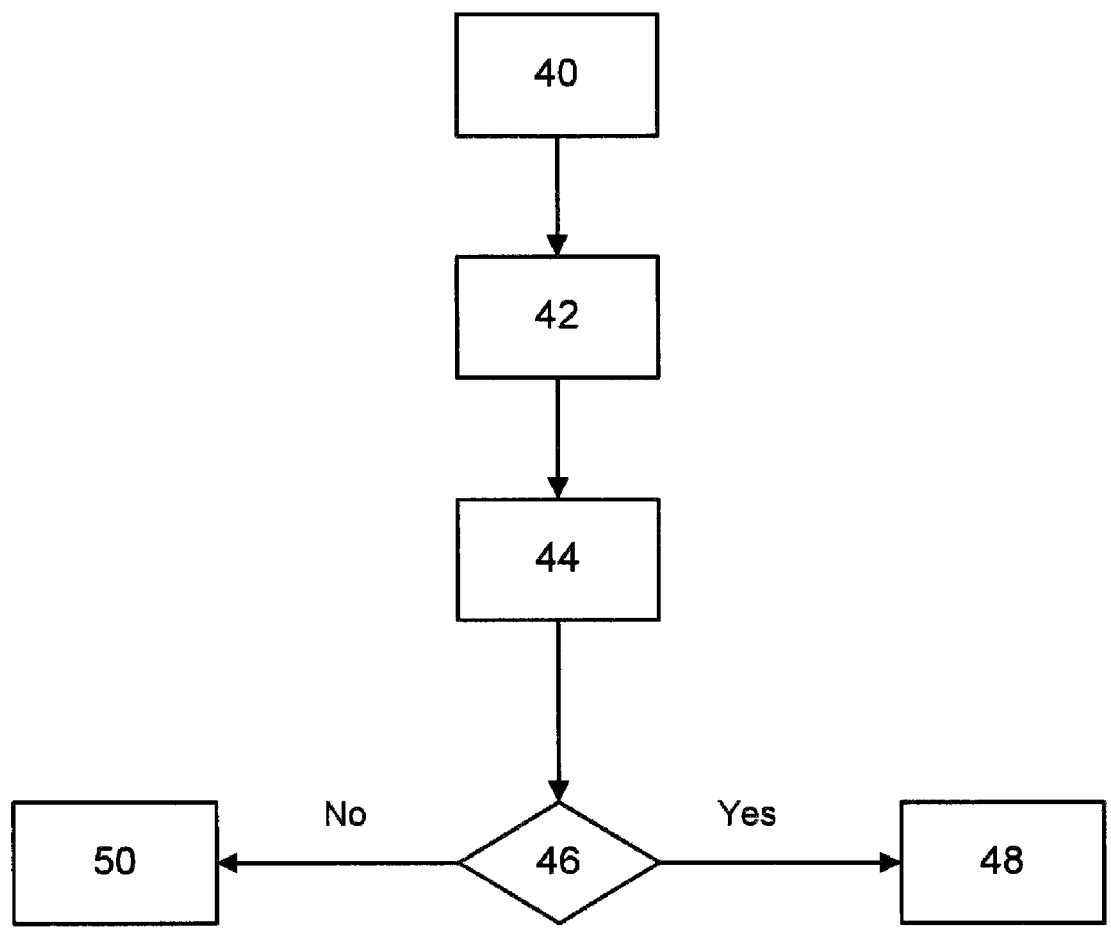
FIG. 3 is a flow chart of a method of handling user input of a change of viewpoint.

A user is able to interact with the displayed image to alter the rendering parameters, for example to set a different viewpoint. The method by which input from a user of a change of viewpoint is processed is depicted in FIG. 3. When user input of a change in rendering parameters is received in step 40, the resulting rendering parameters are stored in step 42. The system controller may also optionally set a flag which indicates that the rendering parameters have changed.

In step 44 the system controller 12 checks the number of images yet to be displayed which are contained in the FIFO buffer 14. The frame rate at which the images are displayed is known and therefore the system controller 12 can calculate the time available before the FIFO buffer 14 is empty.

In step 46 it is then determined whether there is sufficient time for the structural image data and the functional image data group to be reprocessed with the new rendering parameters. In order to ensure a continuous display with reliable frame rate, the system controller 12 will only discard processing of the current group of images with the current rendering parameters if enough there is enough time to reprocess with the new rendering parameters. If there is enough time remaining execution proceeds to step 48 which resets the merging and rendering of the structural image data and the functional image data sets and returns execution to step 24 for processing with the new rendering parameters.

If there is not enough time for processing execution proceeds to step 50 and the new rendering parameters remain stored for use when the next functional data group is processed. It is possible that further user input of another change of parameters will be received before processing of the next functional data group has begun. In that case, the most recent user input of rendering parameters is stored. I.e. the intermediate rendering parameters are discarded without being processed.

Figure 4:
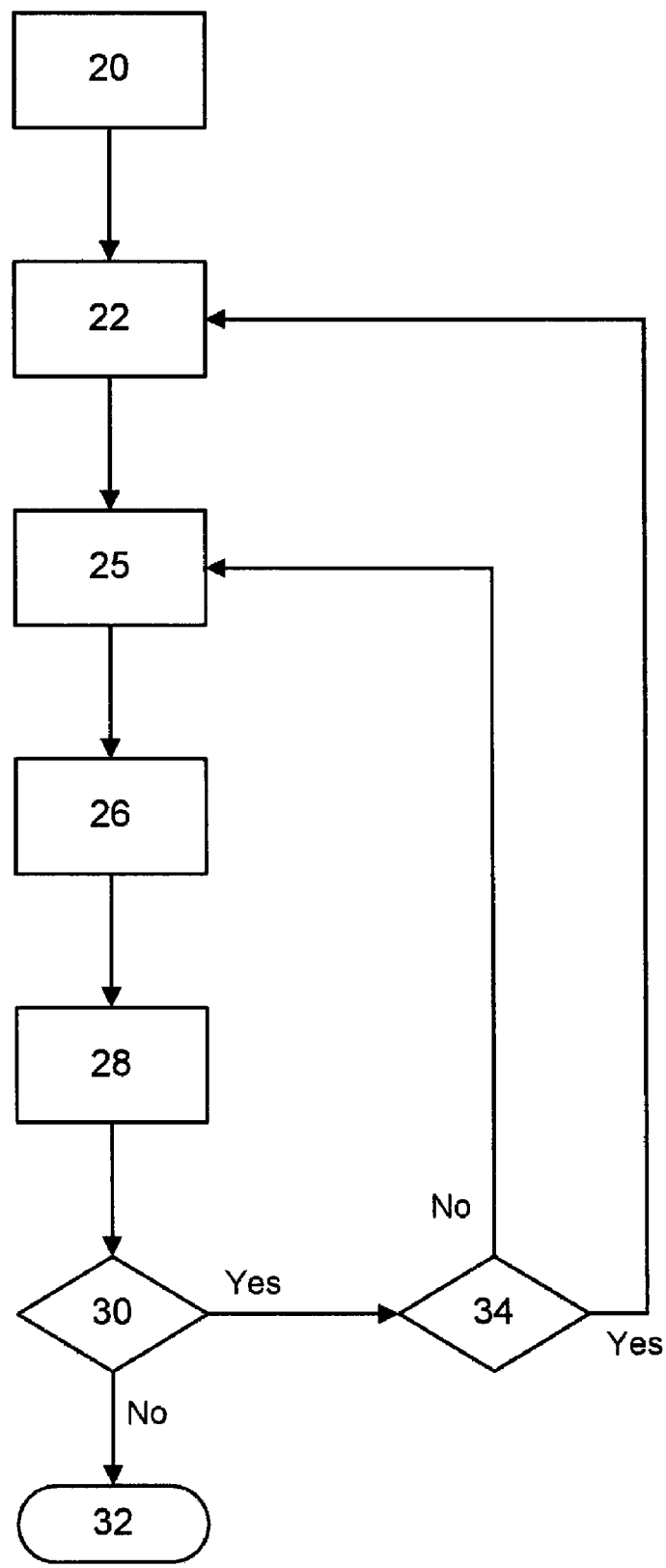
FIG. 4 is a flow chart of the method of a second embodiment of the present invention.

In a second embodiment, which is the same as the first save as described below, the data fusion and rendering module 8 does not take depth relations into account. The method of the second embodiment is depicted in FIG. 4. In this embodiment, the step of fusion and rendering comprises two steps 25 and 26. In a step 25, the structural reference data 2 is rendered using the parameters 10. The rendered structural image data is generated by calculating a two-dimensional projection of the structural reference data.

Once the rendered structural image has been calculated, execution proceeds to a step 26. In the step 26, the two-dimensional projection which makes up the rendered structural image is merged with projections of the functional data. Therefore, in this embodiment, the two-dimensional data fusion does not take into account depth relations.

If it is determined in step 30 that there are further functional data groups to process, execution proceeds to step 34. In step 34, the system controller determines whether the rendering parameters 10 have changed since the last functional data group was processed. If it is determined that the rendering parameters 10 have changed, execution returns to step 25 to render the structural image data from the new viewpoint. However, if it is determined that the rendering parameters have not changed, the structural image data does not need to be rendered again and execution proceeds to step 26 to merge the rendered structural image data with the next functional image data group.

In a third embodiment, which is the same as the second save as described below, step 34 is omitted. In that case processing of the next group is started from step 25 to ensure that any change in the rendering parameters is correctly dealt with.

In a fourth embodiment, which is the same as either the second embodiment save as described below, the rendering parameters are determined at the start of the method and cannot be changed by a user. In this embodiment it is not necessary to determine whether the rendering parameters have changed and step 34 can be omitted. When the next functional image data group is processed after step 30, execution can proceed from step 26 because there will be no change in the rendered structural image.

In further alternate embodiments, the data fusion and rendering module 8 may use only a single rendering technique and may offer a subset of the rendering techniques described in relation to the first embodiment.

The above described embodiments can all be applied to a medical imaging apparatus comprising a storage device and a data processor.

The present invention therefore provides a way of improving the display of anatomical and functional data. By processing and displaying merged data in groups the present invention can generate several fused images of structural and functional data with particular rendering parameters. This group can then be displayed with a predetermined and reliable frame rate. The next group is processed while a previous group is displayed ensuring that a continuous display of data is presented with a reliable frame rate.

The embodiments described above may be combined. Throughout this specification "comprising" is used to indicate an inclusive definition and does not preclude the presence of other items.

The invention claimed is:

1. A method of displaying first image data having a first resolution simultaneously with time-varying second image data having a second resolution which is lower than the first resolution, wherein the time-varying second image data comprises a predetermined number of second image data sets, with each second image data set representing a different point in time, the method comprising:

rendering and merging the first image data with a first group of second image data using rendering parameters representing a viewpoint to produce a first group of merged image data, wherein the first group of second image data comprises a predetermined number of second image data sets which are contiguous in time; and displaying the first group of merged image data as a sequence of images on a display;

wherein each image of the sequence of images includes both the first image data and the time-varying second image data, wherein, during the step of displaying the first group of merged image data, the step of rendering and merging is repeated with a second group of second image data, and wherein rendering and merging of the second group of second image data is completed before the step of displaying the first group of merged image data has completed, wherein the predetermined number of second image data sets is chosen so that a first time to process all the second image data sets is substantially the same as a second time to process the first image data, and wherein the first image data is structural image data of a structure and the second image data is functional image data indicating a function of the structure.

2. A method according to claim 1, wherein a pipeline is used in the step of displaying to allow rendering and merging of the second group of second image data while the first group of merged image data is displayed.

3. A method according to claim 2, wherein the second image data groups are stored as vectors.

4. A method according to claim 1, wherein said step of rendering and merging comprises processing two or more of the second image data sets in parallel.

5. A method according to claim 1, further comprising, when user input is received of a second viewpoint from which the first image data and the second image data is to be displayed, the following steps:

storing second rendering parameters that represent the second viewpoint;

calculating the time remaining before all the rendered and merged image data previously processed has been displayed; and determining whether the time remaining is sufficient for the step of rendering and merging to be restarted and completed in the time remaining, and, if it is determined there is sufficient time remaining, restarting said step of rendering and merging from the second viewpoint.

6. A method according to claim 1, wherein the step of merging and rendering comprises the following steps:

rendering the first image data using rendering parameters representing the viewpoint to produce rendered first image data; and merging a first group of second image data with the rendered structural image data using the rendering parameters to produce a first group of merged image data.

7. A computer program embodied on a non-transitory computer readable medium comprising code means that, when executed by a data processor, instructs the data processor to perform the method of claim 1.

8. A medical imaging apparatus for displaying first image data having a first resolution simultaneously with time-varying second image data having a second resolution which is lower than the first resolution, wherein the time-varying second image data comprises a predetermined number of second image data sets, with each second image data set representing a different point in time, the apparatus comprising:

a storage device for storing instructions executable by a data processor and for storing first image data and a plurality of second image data sets;

a data processor which can be configured by the instructions stored in the storage device to execute the steps of:

rendering and merging the first image data with a first group of second image data using rendering parameters representing a viewpoint to produce a first group of merged image data, wherein the first group of second image data comprises a predetermined number of second image data sets which are contiguous in time; and displaying the first group of merged image data as a sequence of images on a display;

wherein each image of the sequence of images includes both the first image data and the time-varying second image data, wherein, during the step of displaying the first group of merged image data, the step of rendering and merging is repeated with a second group of second image data, and wherein rendering and merging of the second group of second image data is completed before the step of displaying the first group of merged image data has completed, wherein the predetermined number of second image data sets is chosen so that a first time to process all the second image data sets is substantially the same as a second time to process the first image data, and wherein the first image data is structural image data of a structure and the second image data is functional image data indicating a function of the structure.

9. A medical imaging apparatus according to claim 8, further comprising:

an input device for receiving user input of a second viewpoint from which the first image data and the second image data is to be displayed;

wherein the data processing means is further configured by instructions stored in the storage device to execute the following steps when user input of a second viewpoint is received:

storing second rendering parameters that represent the second viewpoint;

calculating the time remaining before all the merged image data previously processed has been displayed; and determining whether the time remaining is sufficient for the steps of rendering and merging to be restarted and completed in the time remaining, and, if it is determined there is sufficient time remaining, restarting said steps of rendering and merging from the second viewpoint.

* * * * *